Jan. 21, 1936.    F. C. WAPPLER    2,028,635
FORCIPATED SURGICAL INSTRUMENT
Filed Sept. 11, 1933    3 Sheets-Sheet 1

INVENTOR
*Frederick Charles Wappler,*
BY
*Frederick Breitenfeld*
ATTORNEY

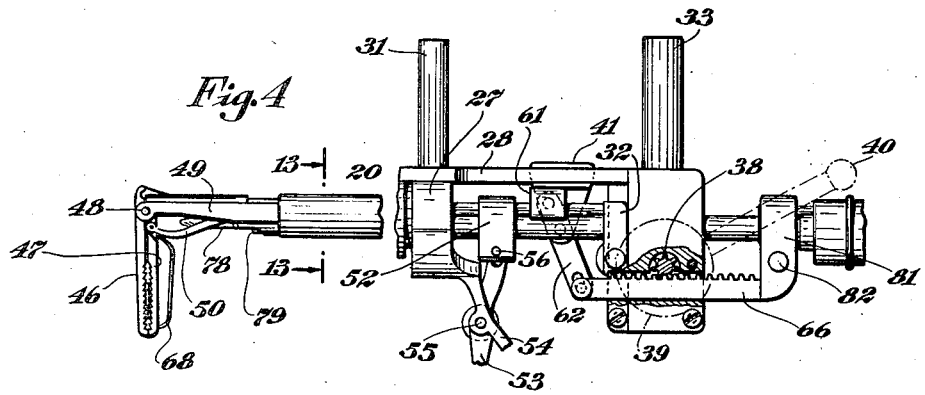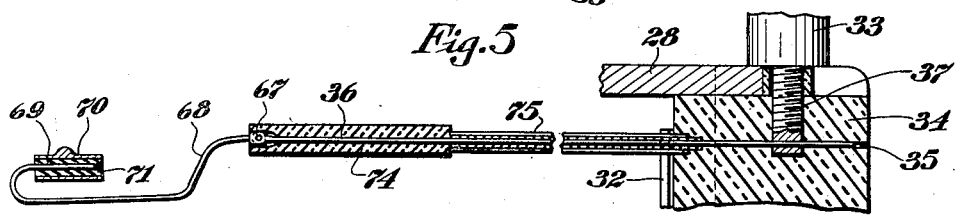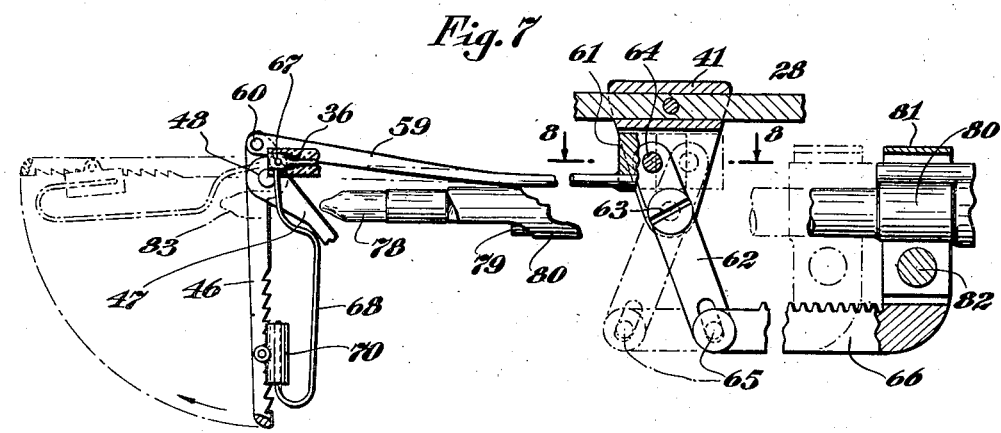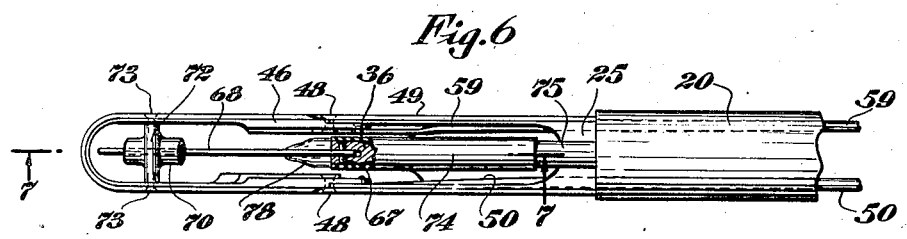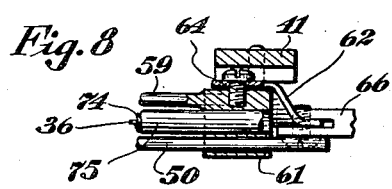

Jan. 21, 1936.  F. C. WAPPLER  2,028,635
FORCIPATED SURGICAL INSTRUMENT
Filed Sept. 11, 1933  3 Sheets-Sheet 3
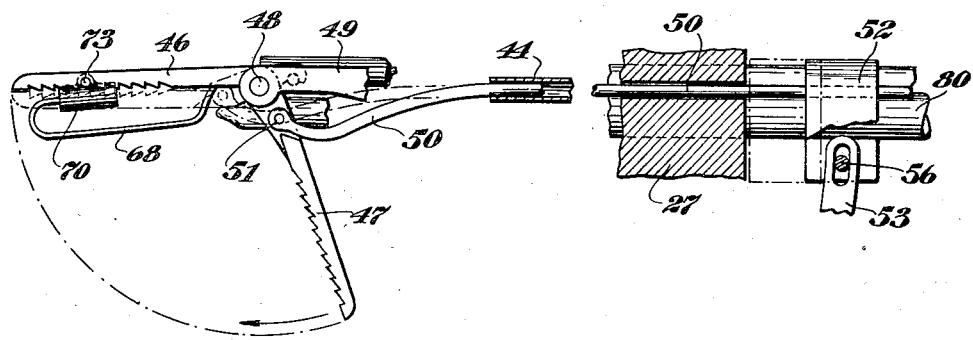
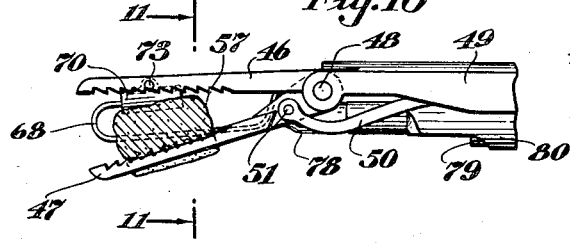
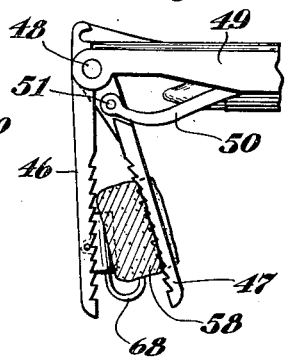
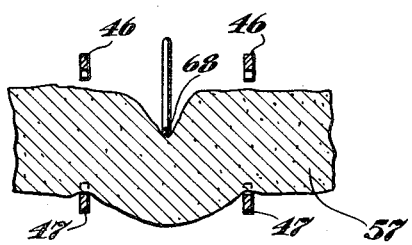
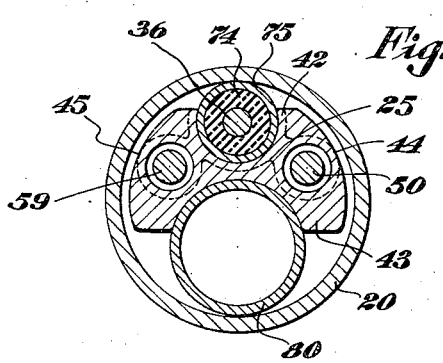
INVENTOR
Frederick Charles Wappler,
BY
ATTORNEY Patented Jan. 21, 1936

2,028,635

UNITED STATES PATENT OFFICE 2,028,635

FORCIPATED SURGICAL INSTRUMENT

Frederick Charles Wappler, New York, N. Y.

Application September 11, 1933, Serial No. 688,937

20 Claims. (Cl. 174—89)

My present invention relates generally to surgical instruments, and has particular reference to an improved type of forcipated instrument.

While I have herein illustrated and shall hereinafter describe my invention in connection with an electrodic device for effecting severance of adhesions or the like by electrical means, it will be understood that certain phases of my invention are not necessarily restricted to a specific application of this character.

The present invention is an improvement and development of the type of instrument illustratively shown and described in the copending application of Reinhold H. Wappler and myself, filed March 24, 1933, Serial Number 662,432.

It is a general object of my invention to provide a forcipated surgical instrument of improved capabilities. More particularly, I aim to improve the type of device in which an elongated supporting stem is provided at its forward end with a pair of complementary grasping jaws, the operation of the jaws being controlled from the rear end of the supporting stem.

A particular feature of my present invention lies in providing an arrangement whereby the effective range of action of such jaws may be varied and adjusted to meet differing requirements. The present device provides a means for pivoting the jaw pair, as a unitary operative device, with respect to the supporting stem, whereby the jaws may be initially adjusted so as to be operative upon tissue lying either in front of the instrument or somewhat to the side of the latter.

Since the invention is of particular importance and utility in connection with the severance of adhesions by means of high-frequency current, I have designed an instrument embodying the features of the present invention and intended primarily for this specific purpose; and it is this particular type of instrument which I have herein chosen for illustration and description.

The severance of an adhesion band, for example, in the pleural cavity, is particularly difficult because of the serious consequences that may result from unchecked hemorrhage. It has proven to be unsatisfactory, in many respects, merely to insert a conventional cutting electrode into the cavity and to cut through the adhesion with an ordinary instantaneous-cutting current of high-frequency. Apart from other difficulties, most adhesions are in a stretched or tensioned condition when the lung is collapsed to effect pneumo-thorax, and to cut through a tensioned area of this character is precarious because of the danger that the band will tear or divide prematurely, leaving the stumps in a condition which is not fully hemostatic.

The foregoing difficulties may be obviated by employing a forcipated instrument of the present general character, whereby an electric current of suitable character, fed to an electrode associated with the jaws, is caused to be applied to the area to be cut coincidentally with a firm and maintained grasp of the area in question. The present instrument also provides a new and improved means for carrying out the new method described in the aforementioned copending application.

Other characterizing features and objectives of the instrument lie in the provision of an efficient telescopic and illuminating means, suitable electric binding posts for establishing the desired connections with a source of high-frequency current, means for efficiently insulating an operative electrode wire from the indifferent portions of the instrument, a mechanism for controlling the movements of the clamping jaws in a simple and reliable manner, and a means for permitting removable association of the electrode with the instrument. Features of particular novelty and importance lie in the provision of an arrangement for permitting the effective range of action of the jaws to be varied without in any way disturbing the electrode wire or its associated parts; and in the provision of a means for automatically shifting the telescopic device in a predetermined relationship to the adjustment of the jaws, whereby the operative electrode wire is constantly maintained under the most efficient type of illuminated vision.

The entire instrument is assembled and constructed in a unitary form which permits it to be feasibly manufactured, easy to manipulate, and insertable into the pleural cavity through only a single opening provided for this purpose. Furthermore, the several parts are so constructed and arranged that disassembly for sterilization purposes may be easily accomplished.

Certain broader phases of my invention, as hereinbefore alluded to, relate generally to a forcipated type of instrument, whether or not an electrodic mechanism and function are provided for.

I achieve the foregoing objects, and such other objects as may hereinafter appear or be pointed out, in the manner illustratively exemplified in the accompanying drawings, wherein—

Figure 4 is a view similar to Figure 2, with certain parts omitted, and illustrating the characteristic of adjustability of the range of action of the jaws;

Figure 5 is an enlarged fragmentary view, partly in section, taken substantially in the direction of Figure 2, and showing the electrode wire and its associated parts;

Figure 6 is an enlarged fragmentary plan view, similar to the left-hand portion of Figure 3 to illustrate the jaw-controlling mechanism and the mounting of the electrode wire;

Figure 7 is a fragmentary cross-sectional view taken substantially along the direction 7—7 of Figure 6, with the electrode jaw in the adjusted position of Figure 4, and with parts omitted for the sake of clearness;

Figure 8 is a detailed cross-sectional view taken substantially along the line 8—8 of Figure 7;

Figure 9 is an enlarged side view similar to the left-hand end of Figure 2, and showing the control of the other jaw;

Figure 10 is a longitudinal side view similar to Figure 9, showing a step in one mode of use of the instrument;

Figure 11 is a diagrammatic cross-sectional view taken substantially along the line 11—11 of Figure 10;

Figure 12 is a view similar to Figure 10, showing the same step but with the jaws in an adjusted relationship; and Figure 13 is an enlarged cross-sectional view taken substantially along the line 13—13 of Figure 4.

Figure 1:
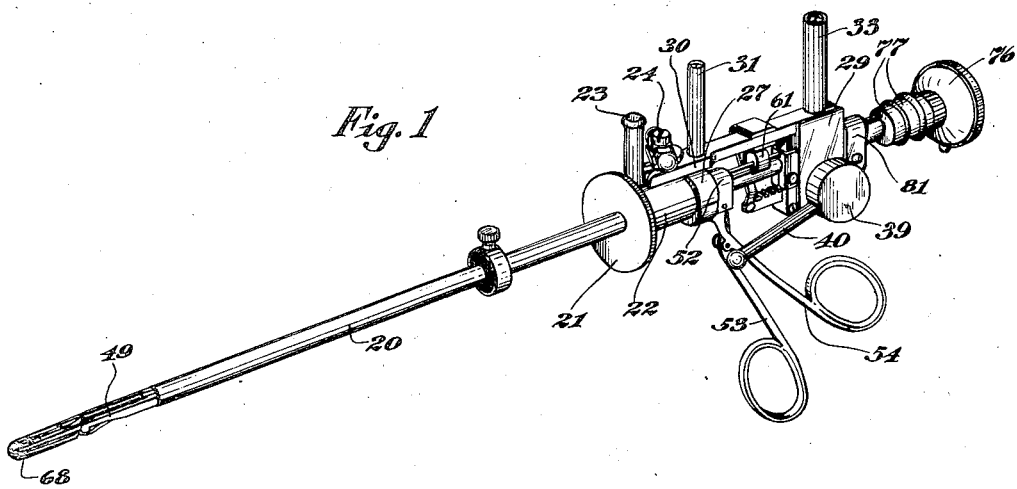
Figure 1 is a perspective view of an instrument embodying the features of my present invention.

The endoscopic tube 20 terminates at its rear end in the flange 21 and in the attachment neck or sleeve 22. The neck 22 carries the irrigation outlet 23 and also suitable mechanism, such as the clamp 24, for facilitating association with the tube 20 of the interior removable assembly.

The operative assembly consists essentially of an elongated supporting stem 25 which is secured to and projects forwardly from the usual plug 26, adapted to fit snugly into the neck 22.

The stem 25 and the plug 26 form part of a rigid unit which forms the backbone of the entire operative assembly. This unit includes the flange 27, the rigid bridging arm 28, and the terminal block 29.

Projecting forwardly from the arm 28 is the fork 30 which engages the clamp 24 when the instrument is assembled. The arm 28 also carries an electric binding post 31 which is mounted in uninsulated relationship, so that all of the parts not specifically insulated from the binding post 31, the arm 28, or the plug 26 are in electrical contact therewith.

The block 29 carries a pair of chuck jaws 32 adapted to engage the rear end of the electrode rod in a removable manner; and the block 29 also carries the insulated binding post 33 whose interior conductive part is adapted to be brought into electrical connection with the conductive part of the electrode rod. One way of accomplishing this is illustrated in Figure 5, in which I show the body portion 34 of the block 29 composed of insulating material and provided with a bore 35 into which the rear end of the conductive member 36 is adapted to extend. A conductive stud 37 is mounted in the body 34 and has a projecting portion adapted to be engaged by the interior conductive portion of the binding post 33. The element 37 is provided with a bore through which the member 36 extends, so that an electrical connection is established between the interior of the binding post 33 and the member 36, while at the same time an insulated relationship is maintained between these parts and the other portions of the instrument.

Also mounted in the block 29 is the pinion 38 coaxially mounted with a controlling wheel 39 provided with a handle 40.

A rigid supporting bracket 41 is carried by the arm 28.

The elongated stem 25 is provided with the upper guide channel or tube 42 (Figure 13), the lower guide channel or tube 43, and the lateral guide tubes 44 and 45.

At the forward end of the stem 25 I mount a pair of complementary U-shaped jaws 46 and 47. Each jaw has two spaced parallel arms joined at the forward end, so that the closed end of the U is directed forwardly, as illustrated most clearly in Figures 3 and 6. These jaws are pivoted to each other at the free ends of the U's, and these pivots 48 serve at the same time to pivot both jaws to the bifurcated forward portion 49 of the stem 25.

Figure 2:
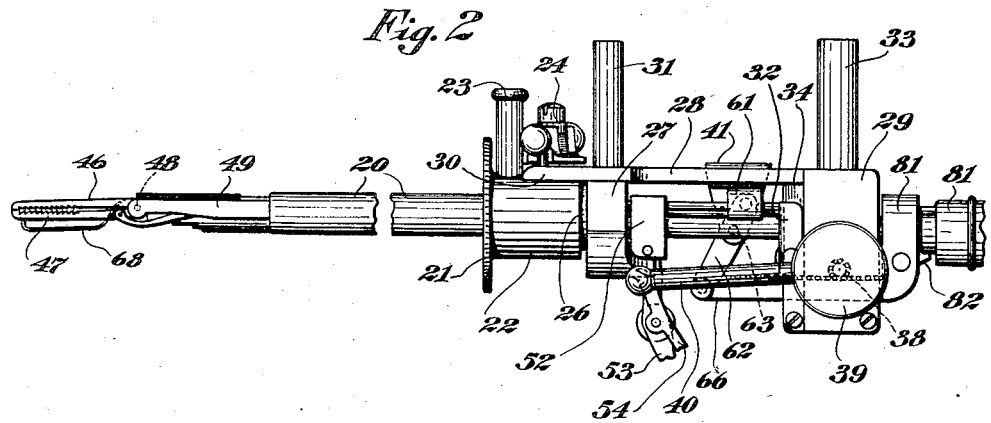
Figure 2 is an enlarged longitudinal side view of the instrument, certain portions being omitted for the sake of clearness.
Figure 3:
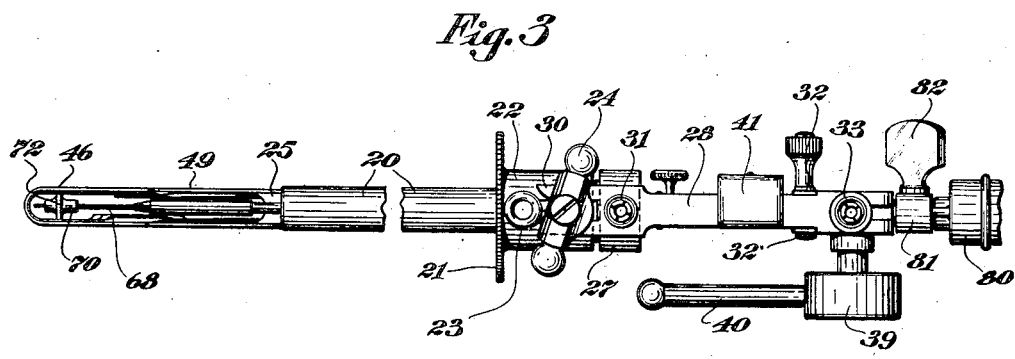
Figure 3 is a plan view of Figure 2.

In accordance with my invention, the jaw 46 may be said to be in a normal position when it is substantially aligned with the axis of the stem 25, as shown in Figures 2, 3, and 9; and a relative pivoting of the jaws is capable of accomplishment by pivoting the jaw 47 between the full-line and the dot-and-dash line positions of Figure 9. This relative pivoting of the jaws, to accomplish an opening and closing of the jaws, is controlled by a rod 50 whose forward end is articulated, as at 51, to the jaw 47. The rod 50 extends rearwardly through the tube 44, thence through a suitable bore in the plug 26 and the block 27, and terminates in rigid engagement with the crosshead 52. The latter is adapted to be reciprocated between the full-line and the dot-and-dash line positions of Figure 9 by means of the scissors-like handles 53 and 54. These handles are pivoted together, as at 55; the handle 54 is rigidly secured at its upper end to the block 27; and the movable handle 53 is articulated, as at 56, to the crosshead 52. Thus, when the handle 53 is drawn toward the handle 54 it causes an advancement of the cross-head 52 and the control rod 50, thereby effecting a movement of the jaw 47 toward the jaw 46. A separation of the handles 53 and 54 effects a corresponding retraction of the control rod 50, thereby drawing the jaw 47 away from the other jaw and ultimately, if desired, into the extreme rearward position of Figure 9. It will thus be seen that the jaw 47 is adapted to be pivoted through approximately 120° with respect to the normal axial position of the jaw 46.

With the jaw 46 in its normal position, a manipulation of the handles 53 and 54 provides a means for effecting a relative pivoting of the jaws to open and close them with respect to a piece of tissue that may be located substantially in advance of the instrument, as, for example, in connection with the illustrative adhesion band 57 of Figure 10. In accordance with my invention, the range of action of the jaws is variable, so that, if desired, the jaws may be adapted to be opened and closed with respect to a laterally disposed piece of tissue, such as the illustrative adhesion band 58 of Figure 12.

To accomplish this adjustment of the jaw pair, as a unit, I provide a second control rod 59 which is disposed in the tube 45 and which is most clearly illustrated in Figure 7. The forward end of the control rod 59 is pivoted, as at 60, to the jaw 46, this point of pivoting being rearward of the pivot 48. The control rod 59 extends rearwardly not only through the plug 26 and the block 27, but also through a suitable bore in the cross-head 52, terminating ultimately in secure engagement with a cross-head 61 most clearly illustrated in Figure 2. The cross-head 61 is adapted to be reciprocated between the limits indicated in Figure 7 by means of a two-armed lever 62 which is fulcrumed at 63 to the bracket 41. The upper end of the lever 62 is pivoted, as at 64, to the cross-head 61; and the lower end of the lever 62 is articulated, as at 65, to the rack 66 which extends rearwardly through the block 29 within which it meshes with the pinion 38.

A clear illustration of the foregoing operation will be found upon comparing Figures 2 and 4. In Figure 2, the handle 40 is disposed forwardly, and the rack 66 is holding the lever 62 in a position which locates the jaw 46 in the forwardly projecting relationship shown. When the handle 40 is turned in a counterclockwise direction (as viewed in Figures 2 and 4) so as to bring it ultimately into the dot-and-dash position of Figure 4, the pivoting of the lever 62 advances the control rod 59 and causes the jaw 46 to swing into the position shown in Figure 4. During this movement, the jaw 46 carries with it the jaw 47 so that the operative clamping device, as a unit, is swung into the lateral relationship shown in Figure 4.

Regardless of the disposition of the jaw pair, the manipulation of the handles 53 and 54, as hereinbefore described, serves to adjust the jaw 47 toward and away from the jaw 46 to accomplish any desired opening and closing of the jaws.

Where the device is provided with an electrode wire, as in the illustrated embodiment, the proper disposition of this wire is likewise unaffected by the positional adjustment of the jaw pair. To accomplish this objective, the electrode wire is constructed and mounted in the manner most clearly shown in Figure 5. The conductive member 36 terminates at its forward end in a pivot 67 which is articulated to the rear end of the uninsulated electrode wire 68. This wire is shaped substantially as shown in Figure 5 to position the straight body portion thereof between the arms of the jaw 46. At the forward end, the wire 68 is doubled back upon itself to provide a journal piece 69, the latter being loosely accommodated within a longitudinal bearing 70 supported between the arms of the jaw 46 and provided with an insulating lining 71. The bearing 70 is rigidly secured to a transverse pivot 72 journaled at its opposite ends 73 in the opposite arms of the jaw 46, as shown most clearly in Figure 6.

Beginning at the pivot 67 and extending rearwardly the conductive member 36 is enveloped in a sheath of insulation 74 which is relatively thick at the forward exposed portion of the electrode member, but which is relatively attenuated rearwardly thereof. The sheath 74 terminates short of the extreme rear end of the member 36 to permit the electrical contact to be established with the stud 37, as hereinbefore described. The rear portion of the insulation 74 is in turn enclosed in an outer metallic sheath 75. It is this sheath which is engaged by the chuck jaws 32.

The electrode member is accommodated within the upper guide channel or tube 42 of the stem 25, and extends rearwardly not only through the neck 26 and the flange 27 but also through suitably prepared bores in the cross-heads 52 and 61.

The electrode member is removably applicable to the instrument, as will be obvious. To remove it, it is merely necessary to release the chuck jaws 32 and to withdraw the member bodily in a forward direction, the journal piece 69 leaving the bearing 70 during this manipulation. When the electrode member is applied to the instrument and pushed rearwardly to its full extent, the pivot 67 is substantially aligned with the pivots 48, whereby a swinging movement of the jaw 46 permits a corresponding movement of the operative portion of the electrode wire. In this way, the electrode wire is constantly maintained in the proper desired relationship to the jaws. This arrangement is such that the electrode wire projects through the arms of the jaw 47 when the jaws are closed. Stated otherwise, the electrode wire is arranged in a longitudinal plane passing through the axis of the jaw 46, the wire being offset from the plane of this jaw in the direction of the jaw 47. Accordingly, when any body is clamped by the forward portion of the instrument, it comes first into engagement with the jaw 47, on one side, and with the electrode wire 68, on the opposite side.

In accordance with my invention, an illuminating telescope is associated with the instrument to permit a constant unimpeded visibility of the wire 68. The telescope which I prefer to employ is of the character illustrated and described in United States Letters Patent No. 1,680,491 and consists of an eyepiece 76, suitable terminal bands 77 for establishing electrical connection with the forward illuminating lamp 78, and an operative lens 79 arranged behind the lamp 78 and commanding an obliquely forward field of vision. The body portion 80 of the telescope is accommodated within the lower guide tube 43 of the stem 25 and extends rearwardly not only through the neck 26 and the flange 27, but also through suitable bores in the cross-head 52 and in the block 29. Near its rear end, the telescope passes through an arm 81 rigidly carried by the rear end of the rack 66. This arm is provided with a clamping arrangement 82 which is adapted to lock the telescope into engagement with the rack 66.

The foregoing arrangement and manner of mounting the telescope permits an unimpeded view of the electrode wire 68 from a rearward point, the visibility extending obliquely forwardly through the arms of the jaw 46. Inasmuch as the field of vision must be slightly shifted when the jaw pair is moved into a lateral position, my present invention provides an automatic means for shifting the telescope whenever the jaws are pivoted with respect to the stem of the instrument. This is accomplished by the interlocking of the telescope with the rack 66, whereby the reciprocation of the rack 66, as illustrated in Figure 7, automatically accomplishes a corresponding reciprocation of the telescope from the forward dot-and-dash position 83 of Figure 7 to the rearward full-line position. This axial shifting of the telescope is thus automatically proportional, in degree, to the obliquity of the jaw pair with respect to the stem of the instrument.

The manner of employing the instrument for the purpose of cutting through a growth, such as an adhesion band, is more fully described in my copending application hereinbefore mentioned. I have illustrated in Figure 11, however, how the adhesion band 57 is initially engaged in carrying out this objective. The engagement is effected between the jaw 47 and the electrode wire 68, under illuminated vision. The engagement is firm and tight, as shown. When a suitable high-frequency current is now supplied to the electrode wire 68 an ultimate severance of the adhesion band is effected, and during this procedure the jaws move toward one another so that ultimately the opposed stumps of the band 57 are engaged between the corresponding arms of the jaws 46 and 47. It is then not until the stumps are carefully examined, and treated, if necessary, that the instrument is permitted to release its engagement from the band. This procedure is carried out in exactly the same way when the jaws are in the position of Figure 12.

It will be understood that the indifferent terminal of a suitable source of high-frequency current is connected to the binding post 31, whereas the active terminal of said source is connected to the binding post 33. The high-frequency current is preferably of the character generated by an apparatus of the kind shown in my copending application Serial Number 581,908, filed December 18, 1931.

It will be understood that the indifferent connection to the generator need not necessarily be made through the jaws 46 and 47, and the more conventional type of remote indifferent electrode may be used, if desired. It will also be understood that the instrument may be used for cutting through neoplasms or growths of other types. From a broader aspect, the instrument may obviously be used for a variety of similar purposes, the jaws being capable of employment, even without the electrode wire, as purely mechanical forceps. It will also be observed that, from certain aspects, the jaw 46 is not always essential, where an electrode wire is used. That is, so far as the clamping of a body against the electrode wire is concerned, the jaw 47 is in itself a sufficient instrumentality for effecting this purpose.

In general, it will be understood that changes in the details, herein described and illustrated for the purpose of explaining the nature of my invention, may be made by those skilled in the art without departing from the spirit and scope of the invention as expressed in the appended claims. It is, therefore, intended that these details be interpreted as illustrative, and not in a limiting sense.

Having thus described my invention, and illustrated its use, what I claim as new and desire to secure by Letters Patent is—

1. In an instrument of the character described, a stem, an operative device at the forward end comprising a pair of complementary jaws, means for pivoting the jaws relative to each other, said means comprising a control rod pivoted at its forward end to one of said jaws and extending rearwardly along the stem, and means for pivoting said device, as a unit, with respect to said stem, said last-named means comprising a control rod pivoted at its forward end to the other of said jaws and extending rearwardly along the stem.

2. In an instrument of the character described, a stem, an operative device at the forward end comprising a pair of complementary jaws, means for pivoting the jaws relative to each other, said means comprising a control rod pivoted at its forward end to one of said jaws and extending rearwardly along the stem, means for pivoting said device, as a unit, with respect to said stem, said last-named means comprising a control rod pivoted at its forward end to the other jaw and extending rearwardly along the stem, and devices at the rear of said stem for actuating said control rods, respectively.

3. In an instrument of the character described, a stem, an operative device at the forward end comprising a pair of complementary U-shaped jaws, a telescope carried by said stem for commanding a field of vision through the space between the arms of the jaws, means for pivoting said device as a unit with respect to said stem, and means controlled by said last-named means for shifting the telescope longitudinally with respect to said stem.

4. In an instrument of the character described, a stem, an operative device at the forward end comprising a pair of complementary U-shaped jaws, a telescope carried by said stem for commanding a field of vision through the space between the arms of the jaws, means for pivoting said device as a unit with respect to said stem, and means controlled by said last-named means for automatically retracting the telescope longitudinally with respect to said stem by a degree proportional to the obliquity of said device to said stem.

5. In an instrument of the character described, a stem, a U-shaped jaw pivoted to the forward end of said stem and normally projecting axially forwardly from said stem, a complementary U-shaped jaw pivoted to the stem, means for pivoting the last-mentioned jaw through approximately 120° with respect to the normal position of the first-named jaw, and independent means for pivoting the first-named jaw through approximately 90° with respect to its normal position, whereby the effective range of action of said jaw pair may be adjusted into varying degrees of obliquity with respect to the stem axis.

6. In an instrument of the character described, a stem, a U-shaped jaw pivoted to the forward end of said stem and normally projecting axially forwardly from said stem, a complementary U-shaped jaw pivoted to the stem, means for pivoting the last-mentioned jaw through approximately 120° with respect to the normal position of the first-named jaw, independent means for pivoting the first-named jaw through approximately 90° with respect to its normal position, whereby the effective range of action of said jaw pair may be adjusted into varying degrees of obliquity with respect to the stem axis, and a telescope carried by said stem for commanding a field of vision through the space between the arms of the jaws.

7. In an instrument of the character described, a stem, a U-shaped jaw pivoted to the forward end of said stem and normally projecting axially forwardly from said stem, a complementary U-shaped jaw pivoted to the stem, means for pivoting the last-mentioned jaw through approximately 120° with respect to the normal position of the first-named jaw, independent means for pivoting the first-named jaw through approximately 90° with respect to its normal position, whereby the effective range of action of said jaw pair may be adjusted into varying degrees of obliquity with respect to the stem axis, a telescope slidably carried by said stem for commanding a field of vision through the space between the arms of the jaws, and means for articulating the telescope to the means controlling the first-named jaw, whereby pivotal movements of said jaw are accompanied by predetermined shifts of the telescope.

8. In an instrument of the character described, a stem, a U-shaped jaw pivoted to the forward end of said stem and normally projecting axially forwardly from said stem, a complementary U-shaped jaw pivoted to the stem, means for pivoting the last-mentioned jaw through approximately 120° with respect to the normal position of the first-named jaw, independent means for pivoting the first-named jaw through approximately 90° with respect to its normal position, whereby the effective range of action of said jaw pair may be adjusted into varying degrees of obliquity with respect to the stem axis, a telescope slidably carried by said stem for commanding a field of vision through the space between the arms of the jaws, and means for automatically shifting the telescope by increments which are proportional to the obliquity of the first-named jaw.

9. In an instrument of the character described, a stem, a pair of complementary U-shaped jaws pivoted to the forward end of said stem, means for independently pivoting said jaws with respect to the stem, said means comprising a pair of control rods arranged along the stem and articulated at their forward ends to said jaws, respectively, and devices at the rear of the stem for actuating said control rods, respectively.

10. In an instrument of the character described, a stem, a pair of complementary U-shaped jaws pivoted to the forward end of said stem, means for independently pivoting said jaws with respect to the stem, said means comprising a pair of control rods arranged along the stem and articulated at their forward ends to said jaws, respectively, and devices at the rear of the stem for actuating said control rods, respectively, one of said devices comprising a rack-and-pinion arrangement interposed between the stem and one of said rods, the other of said devices comprising a pair of scissors handles interposed between the stem and the other control rod.

11. In an instrument of the character described, a stem, a pair of complementary U-shaped jaws pivoted to the forward end of said stem, means for independently pivoting said jaws with respect to the stem, said means comprising a pair of control rods arranged along the stem and articulated at their forward ends to said jaws, respectively, and a telescope carried by the stem for commanding a field of vision through the space between the arms of the jaws.

12. In an instrument of the character described, a stem, a pair of complementary U-shaped jaws pivoted to the forward end of said stem, means for independently pivoting said jaws with respect to the stem, said means comprising a pair of control rods arranged along the stem and articulated at their forward ends to said jaws, respectively, a telescope slidably carried by the stem for commanding a field of vision through the space between the arms of the jaws, and means for articulating the telescope to one of said control rods so as to effect a shifting of the telescope in predetermined relation to the pivoting of the corresponding jaw.

13. In an instrument of the character described, an endoscopic sheath, an elongated supporting stem insertable into said sheath, a pair of complementary U-shaped jaws mounted at the forward end of said stem, means for controlling the relative pivoting of the jaws, means for pivoting the jaw pair, as a unit, with respect to the stem so as to vary the effective range of action of the jaws, a longitudinal electrode wire carried in insulated relation by one of said jaws, said wire being arranged to project through the space between the arms of the other jaw when the jaws are closed, an electric binding post at the rear end of said stem, and means insulated from the stem for conducting a high-frequency current from said binding post to said wire.

14. In an instrument of the character described, an endoscopic sheath, an elongated supporting stem insertable into said sheath, a pair of complementary U-shaped jaws mounted at the forward end of said stem, means for controlling the relative pivoting of the jaws, means for pivoting the jaw pair, as a unit, with respect to the stem so as to vary the effective range of action of the jaws, a longitudinal electrode wire carried in insulated relation by one of said jaws, said wire being arranged to project through the space between the arms of the other jaw when the jaws are closed, an electric binding post at the rear end of said stem, means insulated from the stem for conducting a high-frequency current from said binding post to said wire, and telescopic and illuminating means carried by said stem for commanding an illuminated visibility of the wire thorugh the space between the arms of the jaws.

15. In an instrument of the character described, an endoscopic sheath, an elongated supporting stem insertable into said sheath, a pair of complementary U-shaped jaws mounted at the forward end of said stem, means for controlling the relative pivoting of the jaws, a longitudinal electrode wire carried in insulated relation by one of said jaws, an electric binding post at the rear end of said stem, means insulated from the stem for conducting a high-frequency current from said binding post to said wire, and means for pivoting the jaw pair and the electrode wire, as a unit, with respect to the stem so as to vary the effective range of action of the jaws.

16. In an instrument of the character described, an elongated supporting stem, a U-shaped jaw projecting longitudinally from the forward end of said stem, a complementary U-shaped jaw pivoted at its rear end to the rear of the first-named jaw, means controllable from the rear of the stem for moving the complementary jaw so as to permit of the clamping and unclamping of a body between the jaws, and additional means controllable from the rear of the stem for pivoting the jaw pair, as a unit, with respect to the stem, about an axis transverse to the axis of said stem, so as to vary the effective range of action of the jaws.

17. In an instrument of the character described, an endoscopic sheath, an elongated supporting stem insertable into said sheath, a clamping electrode comprising a pair of complementary, conductive, U-shaped jaws mounted at the forward end of said stem and pivoted to each other at the ends of the U's, means for controlling the relative pivoting of the jaws, means for pivoting the clamping electrode, as a unit, with respect to the stem so as to vary its effective range of action, an electrode wire carried in insulated relation by one of said jaws, said wire being arranged to project through the space between the arms of the other jaw when the jaws are closed, a pair of electric binding posts at the rear end of said stem, means electrically connecting one of said binding posts to said clamping electrode, and means insulated from the stem for conducting a high-frequency current from the other binding post to said wire.

18. In an instrument of the character described, an elongated supporting stem, a U-shaped jaw carried by the forward end of said stem, a complementary U-shaped jaw pivoted at its rear end to the first-named jaw, means controlling the relative pivoting of the jaws, means for pivoting the jaw pair, as a unit, with respect to the stem so as to vary the effective range of action of the jaws, a longitudinal electrode wire carried by the first-named jaw along the axis of the latter and having its forward end supported by the forward portion of said jaw, said wire being arranged to project through the space between the arms of the complementary jaw when the jaws are closed, an electric binding post mounted in insulated relationship at the rear end of the stem, insulated means for electrically connecting said binding post with said wire, and means for insulating the forward end of said wire from the jaw supporting it.

19. In an instrument of the character described, an elongated supporting stem, a U-shaped jaw projecting longitudinally from the forward end of said stem, a longitudinal electrode wire carried in insulated relation by said jaw and alongside of the plane of said jaw, a complementary U-shaped jaw pivoted at its rear end to the rear of the first-named jaw, means controllable from the rear of the stem for moving the complementary jaw so as to clamp a body between the jaws and thereby press the clamped body into firm contact with said wire, means for pivoting the jaw pair, as a unit, with respect to the stem, so as to vary the effective range of action of the jaws, and means for removably mounting said electrode wire in association with the jaw supporting it.

20. In an instrument of the character described, an elongated supporting stem, a U-shaped jaw projecting longitudinally from the forward end of said stem, a longitudinal electrode wire carried in insulated relation by said jaw and alongside of the plane of said jaw, a complementary U-shaped jaw pivoted at its rear end to the rear of the first-named jaw, means controllable from the rear of the stem for moving the complementary jaw so as to clamp a body between the jaws and thereby press the clamped body into firm contact with said wire, means for pivoting the jaw pair, as a unit, with respect to the stem, so as to vary the effective range of action of the jaws, and means for removably mounting said electrode wire in association with the jaw supporting it, said means comprising a clamp at the rear of said stem and a bearing carried by the forward portion of said wire-supporting jaw, and extensions at the rear and forward ends of said wire for engaging, respectively, with said clamp and bearing.

FREDERICK CHARLES WAPPLER.